(No Model.) 6 Sheets—Sheet 1.

A. RANK.
Reaping and Mowing Machine.

No. 235,379. Patented Dec. 14, 1880.

Attest:
R. F. Barnes.
M. J. Smith.

Inventor:
Amos Rank
By his Atty
R. W. C. Smith

N. PETERS, PHOTO-LITHOGRAPHER, WASHINGTON, D. C.

(No Model.) 6 Sheets—Sheet 3.

A. RANK.
Reaping and Mowing Machine.

No. 235,379. Patented Dec. 14, 1880.

Attest:
R. F. Barnes.
M. J. Smith

Inventor:
Amos Rank
By his atty
R. D. O. Smith (No Model.)

6 Sheets—Sheet 4.

A. RANK.
Reaping and Mowing Machine.

No. 235,379. Patented Dec. 14, 1880.

Attest:
R. P. Barnes
M. V. Smith

Inventor:
Amos Rank
By his Atty
R. D. O. Smith (No Model.) 6 Sheets—Sheet 5.
A. RANK.
Reaping and Mowing Machine.
No. 235,379. Patented Dec. 14, 1880.

(No Model.) 6 Sheets—Sheet 6.

A. RANK.
Reaping and Mowing Machine.

No. 235,379. Patented Dec. 14, 1880.

Attest:
R. F. Barnes.
M. V. Smith

Inventor:
Amos Rank
By his atty
R. D. O. Smith

UNITED STATES PATENT OFFICE.

AMOS RANK, OF SALEM, OHIO.

REAPING AND MOWING MACHINE.

SPECIFICATION forming part of Letters Patent No. 235,379, dated December 14, 1880.

Application filed July 30, 1880. (No model.)

*To all whom it may concern:*

Be it known that I, AMOS RANK, of Salem, Columbiana county, in the State of Ohio, have invented a new and useful Improvement in Reaping and Mowing Machines, of which the following is a full and exact description.

That others may fully understand my improvements, I will particularly describe the same, having reference to the accompanying drawings, wherein—

Figure 1:
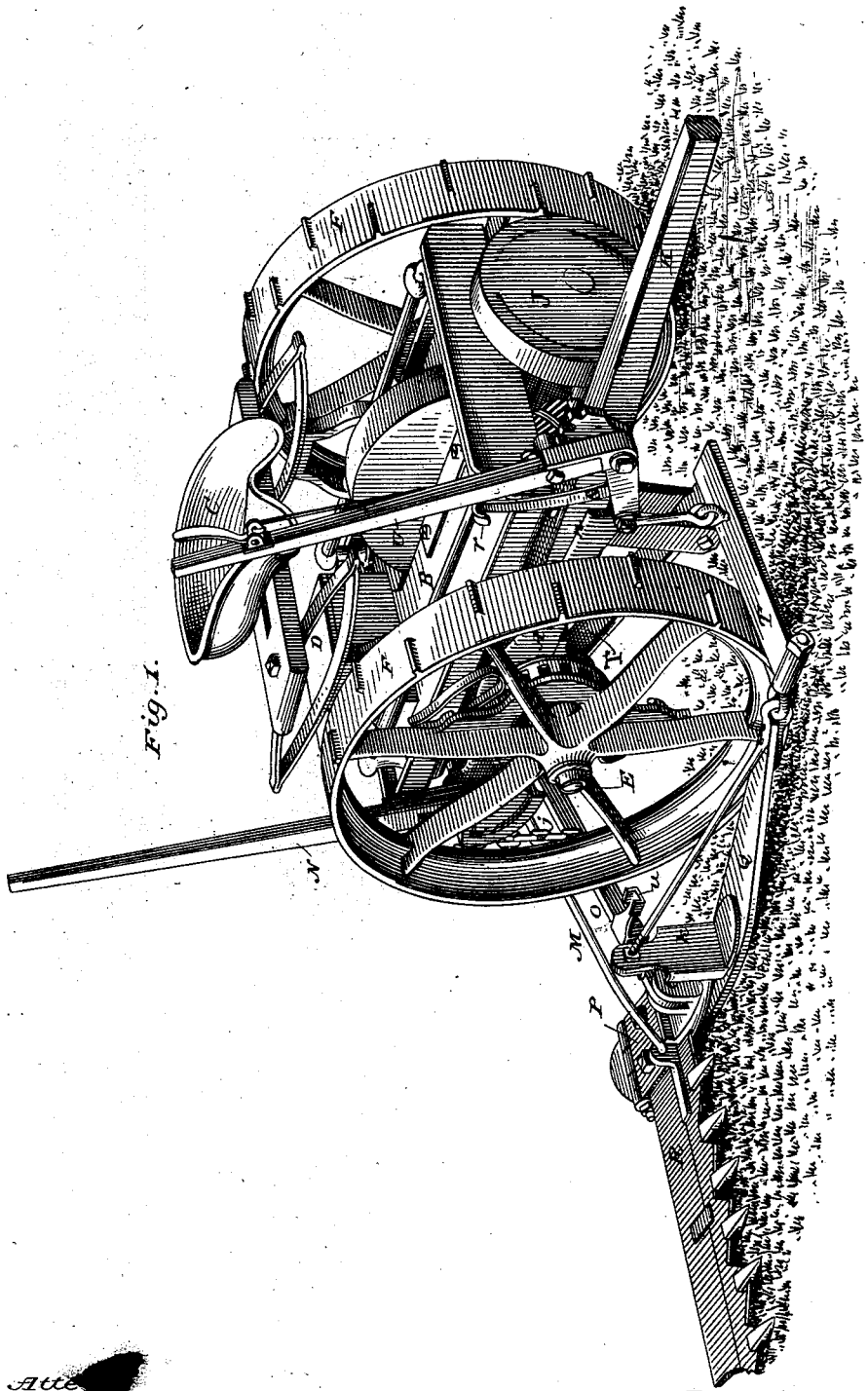
Figure 2:
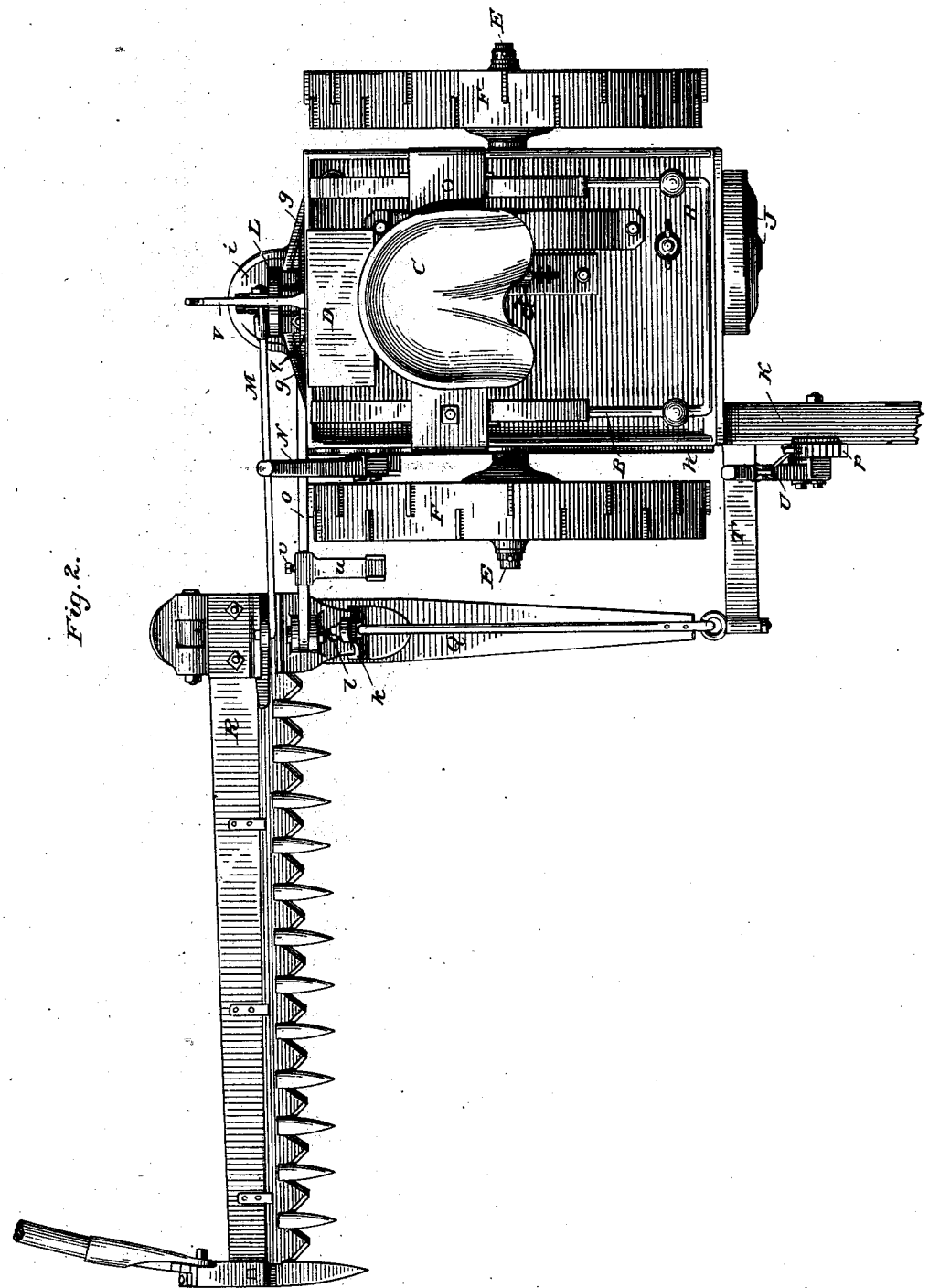
Figure 3:
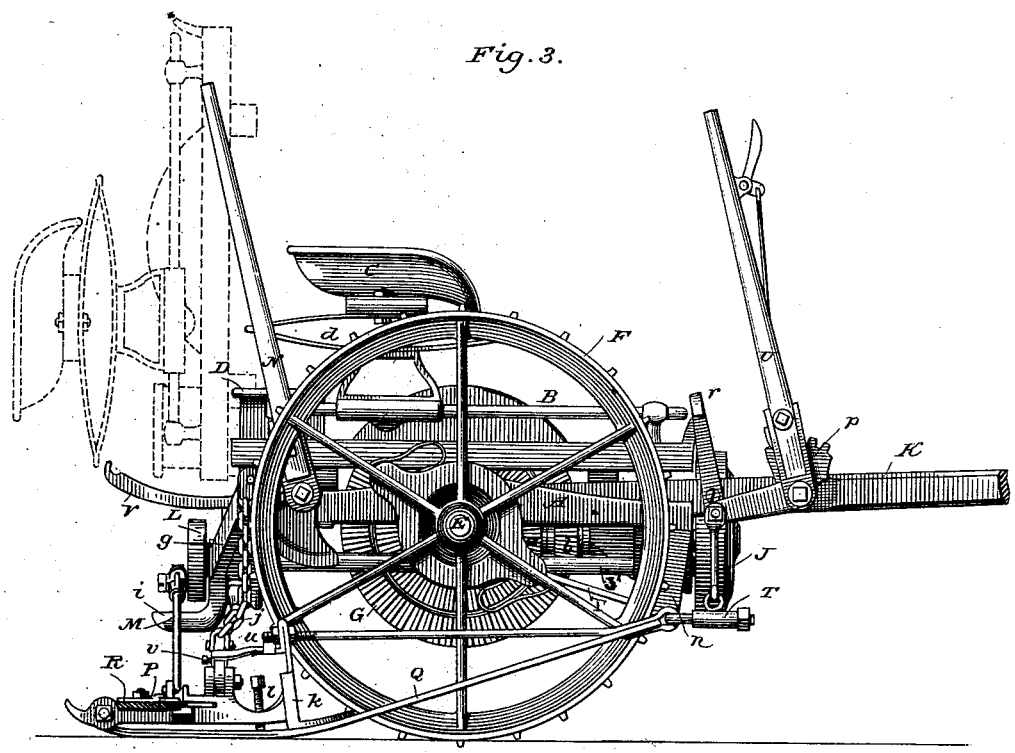
Figure 4:
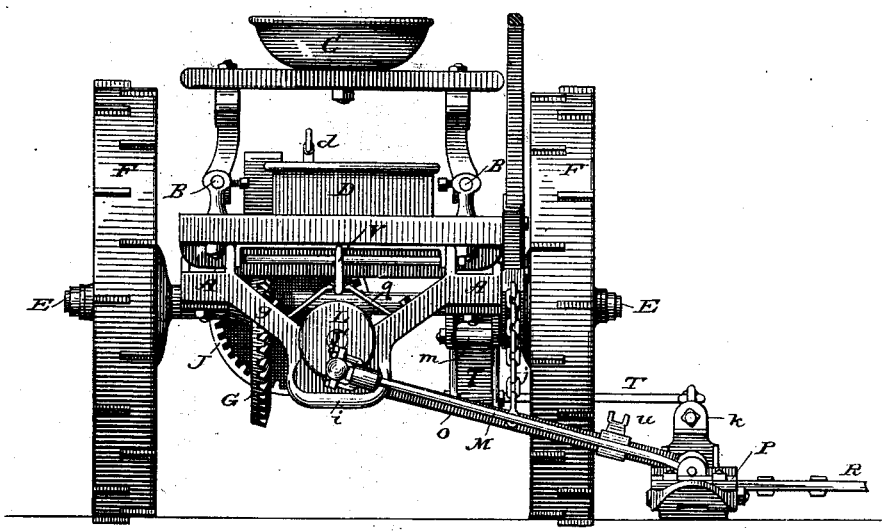
Figure 5:
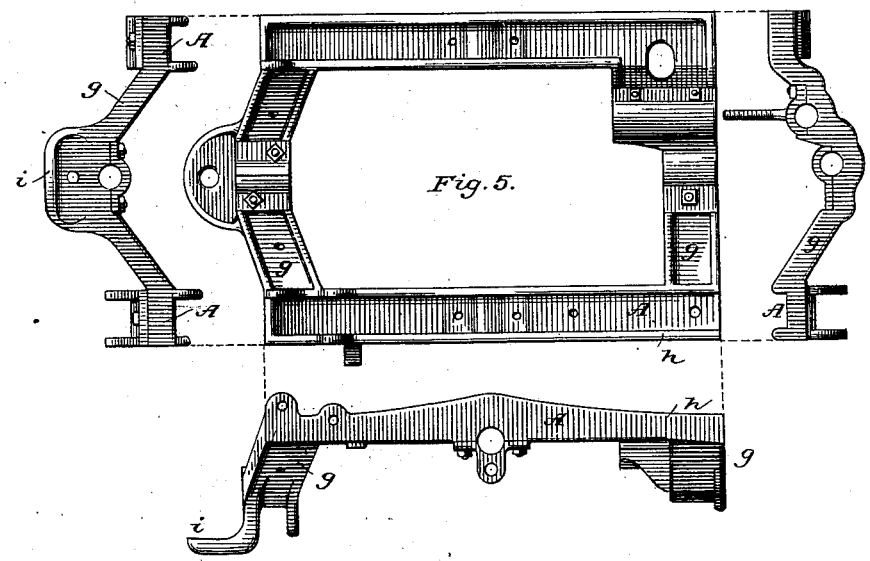
Figure 6:
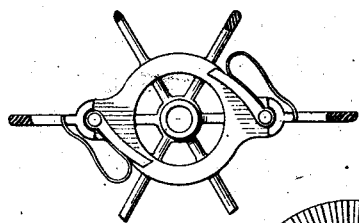
Figure 7:
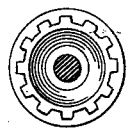
Figure 8:
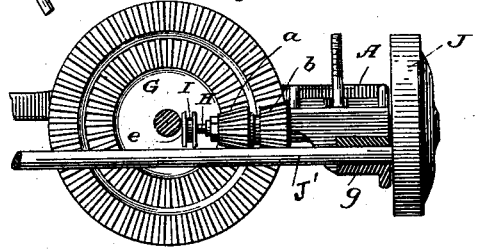
Figure 9:
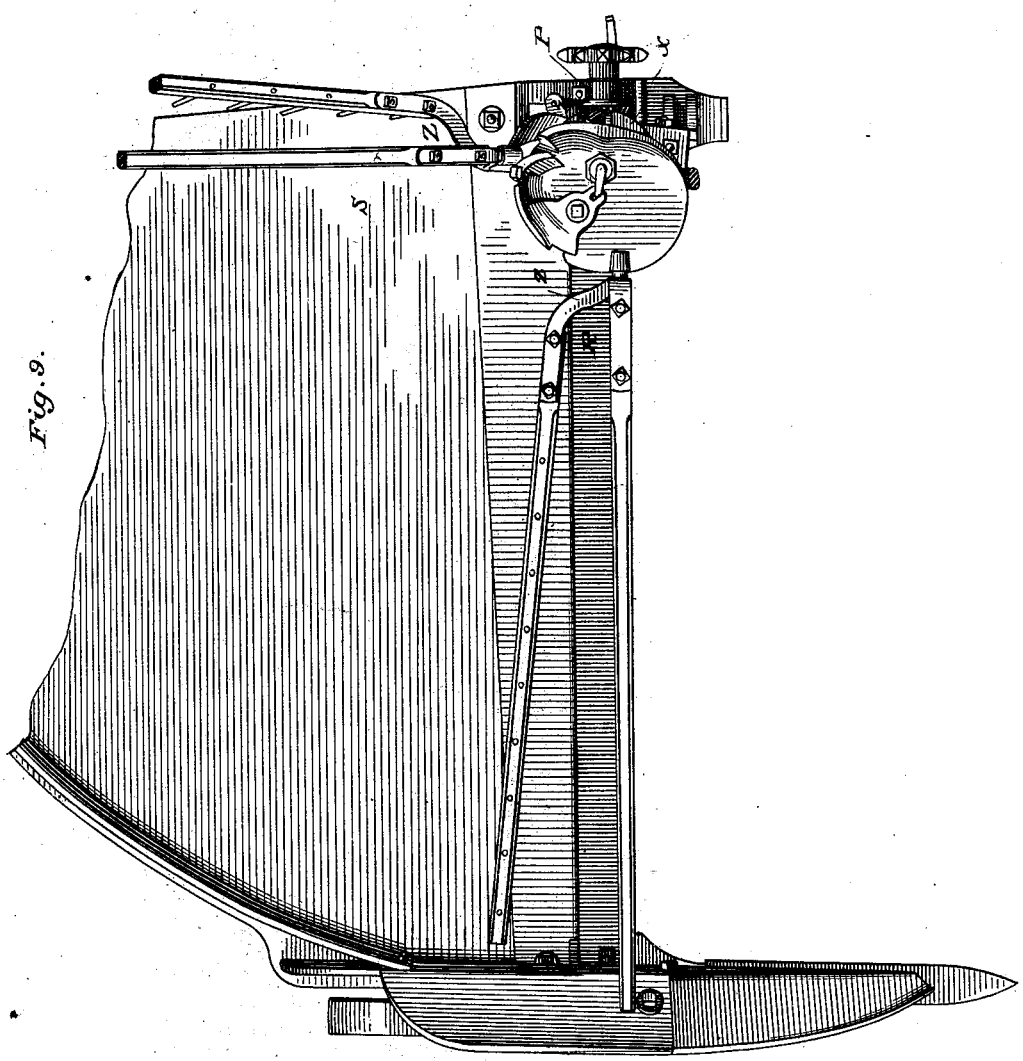
Figure 10:
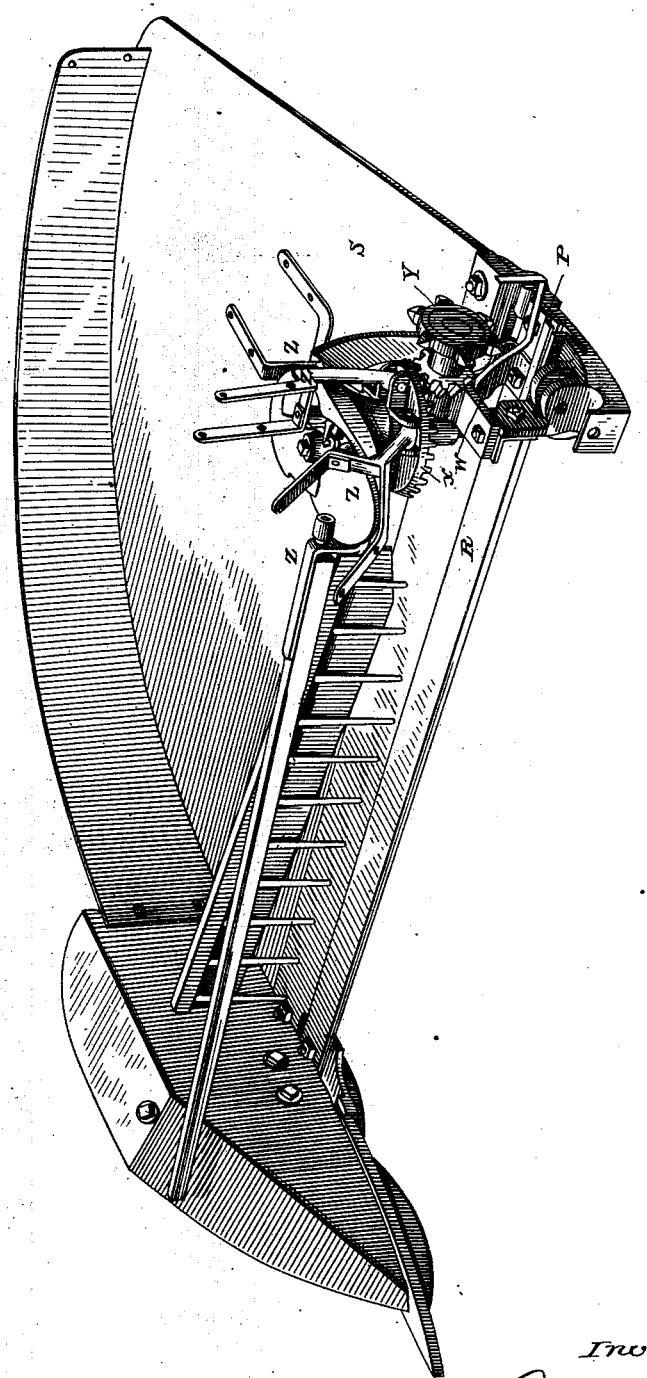

Figure 1 is a perspective view representing my machine in operative condition. Fig. 2 is a plan view of the same. Fig. 3 is a side elevation of the same. Fig. 4 is a rear elevation. Fig. 5 is a plan and elevations of the main frame. Figs. 6, 7, and 8 are details of the gearing. Fig. 9 is a plan showing the connections of the platform and rake to the finger-bar. Fig. 10 is a perspective of the same.

A is the main frame, made in a single piece, of cast metal, and B is the driver's platform, mounted upon said frame, with a hinge-joint at the rear end and some suitable fastening at the front, so that the front end may be readily detached and the whole platform, with the driver's seat C and tool-box D, lifted up and turned back upon said hinge so as to expose the gearing, &c., which is located below the platform.

The main frame is provided with an axle, E, which revolves in boxes supported by the frame, and at the ends of said axle the driving-wheels F F are mounted with ratchet-and-pawl connections, as usual, so that the wheels may turn freely backward, but engage with the axle when turning forward.

Between the side bars of the main frame and secured to the axle E there is a wheel, G, with two concentric sets or rows of bevel-teeth, whereby the motion of the main wheels and axle are transmitted to a short counter-shaft, H, whereon the two meshing bevel-pinions $a$ $b$ are mounted. One or the other of these pinions is locked to the shaft H by means of a sliding internal clutch, I, so that the shaft H is driven from the inner or outer gear-ring of the wheel G, as may be desired. The clutch I is shifted or held in place by the shifting-lever $d$, the lever end whereof engages the grooved head $e$ on the end of the clutch-rod.

At the outer end of the counter-shaft H a heavy internal gear, J, is mounted, and engages with a pinion on the crank-shaft, J'. The wheel J also acts as a balance-wheel to steady the revolution of the crank-shaft.

The crank-shaft J' turns in boxes which are mounted on drooping portions $g$ $g$ of the main frame, so as to place said shaft as near the level of the cutters as possible.

The main frame, being of cast-iron, is strengthened by marginal flanges, $h$ $h$, and the rear end of the tongue K is seated between said flanges on the inner or right-hand side of the frame, and therefore all the lateral strains on said tongue are sustained by the flanges, and not by the holding-bolts. The attachment of the tongue is thereby greatly strengthened.

A crank-wheel, L, is placed on the shaft J at its rear end, and carries the wrist for the joint of the pitman M.

There is also a shield, $i$, projecting from the frame backward and below the crank-wheel L to protect it from contact with the ground or any object over which the machine may be drawn.

A hand-lever, N, with a segment at its lower end, is mounted, with its usual ratchet-locking plate, at the rear inner corner of the main frame, and is attached to the coupling-arm O by means of a chain, $j$, for the purpose of raising the inner shoe from the ground whenever it is desired to do so. The coupling-arm is jointed to the main frame at a point immediately beneath the crank-shaft and as close to it as possible. At its outer end it is jointed to the shoe P. The shoe P is hinged at its rear end to the rear end of the drag-bar Q, which therefore extends under the shoe and presents the real wearing-surface to the ground. In front of the point of the shoe a guide-plate, $k$, is fixed upon the drag-bar Q, to prevent lateral motion of the front of the shoe, while it may freely move up and down in a vertical plane in said guide. A gage-screw, $l$, is inserted through the shoe P near its front end to adjust the shoe and points of the cutters.

The cutting apparatus R is attached to the shoe in the usual way, and when used as a mower a track-clearer is attached to the shoe at the outer end. When used as a reaper a platform, S, is attached to the rear edge of the cutting apparatus, and its outer end is then supported upon a grain-wheel.

Heretofore in machines of the character of this machine the drag-bar has been either fixed at its front end or has been arranged to slide up and down in a guide, or attached to the end of a pivoted arm which is transverse to the frame, and all of the strain incident to the advancement of the cutting apparatus while at work was therefore sustained by said guide or arm, and to shift the position of the drag-bar required an application of force adequate to overcome the friction due to the power required to advance the cutting apparatus. To obviate this resistance, I attach the front end of the drag-bar Q to one extremity of an L-shaped arm, T, the other extremity of which is hinged to the main frame at $m$ in the vicinity of the axle E. That part of the arm T which is hinged to the main frame is also supported against the lateral strain by a guide-bracket, $n$, or by a string-brace which may extend to the opposite side of the machine; or the hinge at $m$ may be made broad enough to sustain the strain without assistance. At the angle of the arm T it is attached to a bell-crank lifting-lever, U, which is pivoted to the side of the tongue or frame, and is provided with a ratchet-segment, $p$, and the usual hand-piece and latch. By means of this lever the arm T may be raised or lowered at will, and the points of the guards and cutters tilted up or down correspondingly. By this means the sliding friction mentioned is entirely obviated.

When the machine is used as a mower the cutting apparatus may be folded over to a horizontal position back of the main frame, to facilitate its transportation from place to place; and I place an arm, V, upon a wrought-metal arch, $q$, the feet of which are secured to the drooping part $g$ of the frame for the cutting apparatus to rest upon, the shoe P being then held up from the ground by the lever N, which is thrown over forward and held by the holder $r$.

When the machine is employed as a reaper an arch or bridge, W, is placed upon the shoe P to support the rake-stand X, and a short shaft projects laterally therefrom to receive the sprocket-wheel Y, whereon the driving-chain is mounted to transmit motion from the main wheel F to the rake and reel Z, the shaft of the sprocket-wheel Y being provided at its inner end with a bevel-pinion in mesh with a similar gear-ring on the under side of the rake-stand X.

To permit the necessary independence of movement between the main frame and the cutting apparatus, it is necessary that the chain shall be left somewhat slack, and it is then liable to encounter obstructions and to gather straw, &c., as it moves. To obviate this I place a guide and shield plate, $u$, upon the coupling-arm $o$, and projecting forward therefrom as far as may be necessary. The chain travels directly above said shield, and sometimes in contact with it.

By means of a set-screw, $v$, or other suitable device, the shield $u$ is made both adjustable along the coupling-arm and removable therefrom, as may be required.

The improvements in this case are:

First, the rocking or vibrating drag-bar arm or vibrating drag-bar frame, hinged at its rear end to the main frame or axle-cap under or near the axle or drive-wheel shaft moving up and down in a loop or guide located on the under side of the main frame, under the tongue, and running out from the main frame at right angles, and terminating in an eye for the front end of the drag-bar. By means of this improvement the reaping-platform and cutter-bar can be rocked and rolled at the will of the operator, the drag-bar moving up and down in a parallel line with the main frame and keeping the self-rake chain more nearly at the same tension in the various positions of the cutting apparatus than the old ways. In mowing, it is used to raise and lower the points of the guards at will.

Second, the adjustable and removable spring chain-guide, located on the rear or lateral brace, where it is easily applied and adjusted.

Third, the wrought-iron arch spanning the rear dropping-bracket and stiffening the same and carrying a wrought-iron hook for carrying the inside of the reaping attachment, and to hold up the mower-bar when it is folded for transportation.

Having described my invention, what I claim as new is—

1. The drag-bar vibrating arm or frame T for a mowing or reaping machine, adapted to be hinged to said machine at or near the axle, constructed and operating substantially as shown and described.

2. The combination, in a mowing or reaping machine, of a drag-bar vibrating arm or frame, T, hinged at its rear end at or near the axle, with the main frame, all constructed substantially as shown and set forth.

3. The combination, in a mowing or reaping machine, of a drag-bar vibrating arm or frame, T, constructed as described, hinged at its rear end to the frame at or near the axle, with a vibrating drag-bar, O, jointed to the front end of said arm T, and a hinged cutting apparatus, R, substantially as shown and set forth.

4. The combination, in a mowing or reaping machine, of a drag-bar vibrating arm or frame, T, constructed as described and hinged at or near the axle, a main frame, A, constructed as described, and a vibrating drag-bar, and a hinged cutting apparatus, R, substantially as shown and set forth.

5. An adjustable and removable chain-guide, $u$, located on the coupling-arm $o$, substantially as shown and described.

6. The combination, in a mowing and reaping machine, constructed as described, of the wrought-iron arch-piece $q$, spanning the rear hanger, $g$, and carrying a wrought-iron supporting-arm, V, substantially as shown and set forth.

7. The combination, in a two-wheel hinge-joint reaping-machine, of the main frame A, the drag-bar vibrating arm or frame T, hinged at its rear end at or near the axle, the vibrating drag-bar, the quadrant-shaped reaper-platform S, and the self-raking apparatus located on the platform, substantially as shown and described.

8. In double-jointed hinged-bar reaping-machine, a rake and reel located on the inner front corner of the platform, and a driving-chain extending therefrom to the main wheel, combined with an elastic chain guide and shield, $u$, adjustably mounted on the coupling-arm $o$, as set forth.

AMOS RANK.

Attest:
HENRY C. JONES,
ISRAEL BARBER.